US012571569B2

(12) United States Patent
Köster et al.

(10) Patent No.: US 12,571,569 B2
(45) Date of Patent: Mar. 10, 2026

(54) DEVICE FOR SEPARATING A GASEOUS AND A LIQUID PHASE OF A WORKING MEDIUM AND FOR STORING THE LIQUID PHASE

(71) Applicant: Hanon Systems, Daejeon (KR)

(72) Inventors: Stephan Köster, Langerwehe (DE); Andreas Roeder, Puhlheim (DE); Christian Sett, Viersen (DE); Rene Cezanne, Leverkusen (DE)

(73) Assignee: HANON SYSTEMS, Daejeon (KR)

( * ) Notice: Subject to any disclaimer, the term of this patent is extended or adjusted under 35 U.S.C. 154(b) by 423 days.

(21) Appl. No.: 17/998,238

(22) PCT Filed: Nov. 11, 2021

(86) PCT No.: PCT/KR2021/016405
§ 371 (c)(1),
(2) Date: Nov. 8, 2022

(87) PCT Pub. No.: WO2022/108236
PCT Pub. Date: May 27, 2022

(65) Prior Publication Data
US 2023/0341159 A1     Oct. 26, 2023

(30) Foreign Application Priority Data

Nov. 20, 2020   (DE) ..................... 10 2020 130 718.7
Sep. 29, 2021   (DE) ..................... 10 2021 125 240.7

(51) Int. Cl.
    *F25B 43/00*      (2006.01)
    *B01D 19/00*      (2006.01)
    *B04C 5/04*       (2006.01)

(52) U.S. Cl.
CPC ........ *F25B 43/006* (2013.01); *B01D 19/0057* (2013.01); *B04C 5/04* (2013.01)

(58) Field of Classification Search
CPC ...... F25B 43/006; B01D 19/0057; B04C 5/04
See application file for complete search history.

(56) References Cited

U.S. PATENT DOCUMENTS 4,276,756 A   *   7/1981   Livesay ................ F25B 43/006
                                      62/298
5,076,071 A     12/1991   Morse
(Continued)

FOREIGN PATENT DOCUMENTS

EP         1564510 A2    8/2005
EP         1564510 B1    4/2008
(Continued)

*Primary Examiner* — Dung H Bui
(74) *Attorney, Agent, or Firm* — Shumaker, Loop & Kendrick, LLP; James D. Miller

(57) ABSTRACT

A device for separating a gaseous and a liquid phase of a working medium and for storing the liquid phase. The device has a volume enclosing wall with closed end faces, an inlet and an outlet, as well as a suction pipe. A partition element is arranged within the volume, which divides the volume in a separation volume and a storage volume. The separation volume is formed above the partition element in a direction z of gravity, while the storage volume is formed below the partition element. The suction pipe opens into the separation volume.

17 Claims, 5 Drawing Sheets

(56) References Cited

U.S. PATENT DOCUMENTS

| | | | | |
|---|---|---|---|---|
| 6,223,555 | B1* | 5/2001 | Schroeder | F25B 43/006 62/503 |
| 6,389,843 | B2* | 5/2002 | McAllister | B01D 53/0415 62/509 |
| 10,215,461 | B2* | 2/2019 | Hosokawa | F25B 43/003 |
| 11,058,980 | B2 | 7/2021 | Zapletal | |
| 11,162,721 | B2* | 11/2021 | Cho | F25B 43/003 |
| 2005/0229632 | A1 | 10/2005 | Obrist et al. | |
| 2008/0041093 | A1* | 2/2008 | Sung | F25B 43/006 62/503 |
| 2014/0331713 | A1 | 11/2014 | Takeda et al. | |
| 2015/0345844 | A1 | 12/2015 | Köster et al. | |
| 2017/0016657 | A1* | 1/2017 | Hosokawa | F25B 43/003 |
| 2020/0047098 | A1 | 2/2020 | Zapletal | |
| 2021/0300149 | A1* | 9/2021 | Zapletal | B60H 1/00335 |

FOREIGN PATENT DOCUMENTS

| | | | |
|---|---|---|---|
| JP | 2008134022 | A | 6/2008 |
| JP | 5644469 | B2 | 12/2014 |
| JP | 5982114 | B2 | 8/2016 |
| JP | 2016217590 | A | 12/2016 |
| KR | 20070099759 | A | 10/2007 |
| KR | 20160117683 | A | 10/2016 |

* cited by examiner

Fig. 1A
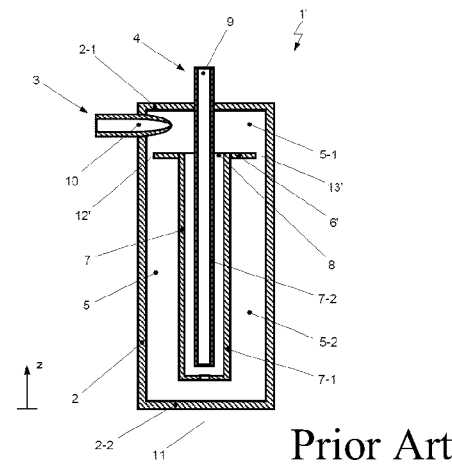
Prior Art
Fig. 1B
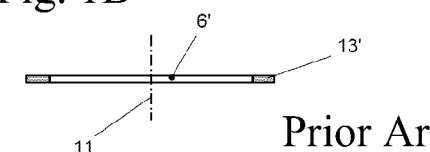
Prior Art
Fig. 2A
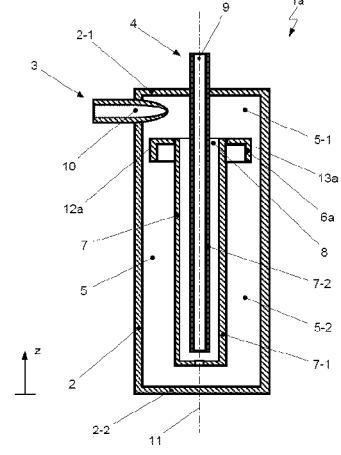
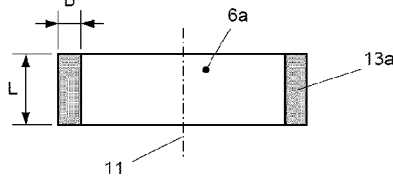
Fig. 2B Prior Art

DEVICE FOR SEPARATING A GASEOUS AND A LIQUID PHASE OF A WORKING MEDIUM AND FOR STORING THE LIQUID PHASE

CROSS REFERENCE TO RELATED PATENT APPLICATIONS

This is a U.S. national phase patent application of PCT/KR2021/016405 filed Nov. 11, 2021 which claims the benefit of and priority to German Pat. Appl. No. 10 2021 125 240.7 filed on Sep. 29, 2021 and German Pat. Appl. No. 10 2020 130 718.7 filed on Nov. 20, 2020, the entire contents of each of which are incorporated herein by reference.

TECHNICAL FIELD

The invention relates to a device for separating a gaseous and a liquid phase of a working medium and for storing the liquid phase, in particular of a refrigerant, in a refrigerant circuit.

BACKGROUND ART

The device has a volume enclosing, hollow circular cylinder-shaped wall with closed end faces, an inlet and an outlet, as well as a suction pipe. A partition element is arranged within the volume, which divides the volume in a separation volume and a storage volume. Here, the separation volume is formed above the partition element in a direction z of gravity, while the storage volume is formed below the partition element in the direction z. The suction pipe is formed with a first open end for receiving the gaseous phase of the working medium and a second open end as a connection to the outlet of the device. Here, the suction pipe with the first open end opens into the separation volume.

In refrigerant circuits of compression refrigeration systems known from the prior art, also referred to as cold vapor compression refrigeration circuits, a refrigerant reservoir is provided in various applications. In the case of an arrangement of the refrigerant reservoir in the low-pressure area of the refrigerant circuit, in the direction of flow of the refrigerant between a heat exchanger operated as an evaporator and a compressor, the refrigerant reservoir is referred to as an accumulator, and in the case of an arrangement in the high-pressure area of the refrigerant circuit, in the direction of flow of the refrigerant downstream of a condenser/gas cooler, the refrigerant reservoir is referred to as a collector. The accumulator in particular, as a separator, in addition to storing the liquid portion, is also used for phase separation of the working medium emerging from the evaporator, which is present as a two-phase mixture in a gaseous and a liquid phase. In addition to the lubricating oil, only the gaseous portion of the working medium should be sucked in from the accumulator by the compressor.

Additional refrigerant of the refrigerant circuit is stored in the accumulator, for example to compensate for refrigerant escaping during a maintenance interval. In addition, the amount of refrigerant circulating in the refrigerant circuit depends on the operating state of the system. The quantities of non-circulating refrigerant occurring between the different operating states are temporarily stored in the accumulator.

For the functions of separating the gaseous and liquid phase on the one hand and storing the liquid phase of the working medium on the other hand, the volume of the accumulator must be divided into two areas—a first area for phase separation and a second area for storing the liquid phase.

In large-volume accumulators, only gravity is traditionally used to separate and store the liquid phase, so that no additional partition elements are required between the two areas. Here, the upper half of the accumulator in the direction of gravity is used for separating the phases and the lower half for storing the separated liquid.

Cyclone technology is known from the prior art for separating the gaseous and liquid phases of the working medium, with which the volume required for separating the phases within the accumulators can be reduced and the efficiency of the phase separation can be increased. With the use of a partition plate between the first area for the phase separation and the second area for storing the liquid phase, the volume portion for storing can be increased, while the volume portion for the phase separation is reduced. With accumulators formed in this way, a maximum of about 70% of the volume can be used for storing liquid working medium.

In addition, the partition plates known from the prior art enable the gaseous phase to continue to interact with the stored liquid working medium. In this case, portions of the gaseous phase pass through a ring gap formed between an inner wall of the lateral surface of the reservoir and the partition plate in the direction of the storage volume. As a result of high flow rates, the gaseous working medium swirls the stored liquid working medium, so that the liquid phase can also be sucked out of the accumulator even before the storage volume is completely filled. The swirling of the phases and the resulting suction effect of the liquid phase depends on the mass flow of the working medium.

In addition to HFC refrigerants, natural refrigerants such as carbon dioxide with the designation R744 used in refrigeration technology, are conventionally used as working mediums, for example.

In automotive applications, the refrigerant circuit of the air conditioning system is mainly used to cool the supply air to the passenger compartment at high ambient temperatures. The refrigerant circuit is operated in the refrigeration system mode.

With increasing electrification of motor vehicles, the waste heat from the internal combustion engines for heating the supply air to the passenger compartment is no longer available, especially at low ambient temperatures. However, since heating with purely electrical energy significantly reduces the range of specially electrically operated motor vehicles, the refrigerant circuits, which are used to cool the supply air at high ambient temperatures, are increasingly operated in a heat pump mode at low ambient temperatures.

Since the refrigerant circuits with R744 as the working medium are at least equal to refrigerant circuits with conventional HFC refrigerants as the working medium when operating in the refrigeration system mode, in terms of the required output and thus efficiency and are even clearly superior in the heating mode or when operating in the heat pump mode, R744 is becoming increasingly more prevalent as a working medium, especially in the course of the electrification of passenger motor vehicles.

Transcritically operated refrigerant circuits with R744 as the working medium differ from subcritically operated refrigerant circuits with HFC refrigerants as the working medium in that the refrigerant reservoir for liquid refrigerant as the accumulator is always arranged on the low-pressure side downstream of the evaporator and cannot also be arranged as a collector downstream of the high-pressure side condenser/gas cooler.

In addition, refrigerant circuits with R744 as the working medium are formed with an additional internal heat exchanger. The internal heat exchanger is understood to mean a circuit-internal heat exchanger which serves to transfer heat between the refrigerant at high pressure and the refrigerant at low pressure. For example, on the one hand the liquid refrigerant is cooled further after liquefaction or cooling in the gas cooler and on the other hand the suction gas is superheated upstream of the compressor. With the circuit-internal heat exchanger, at least equivalent and even higher efficiency is achieved during operation than when operating comparable refrigerant circuits with HFC refrigerants as the working medium.

In order to avoid the formation of an additional component, the components accumulator and circuit-internal heat exchanger are combined into one integrated component. Compared to the design of individual components, the greatest challenge in the design of the integrated component is to keep the space requirement as low as possible, also in order to minimize the weight associated with the size and the manufacturing costs, but also to ensure the installation capability in the vehicle architecture. Compared to an accumulator designed as an individual component, the accumulator of an integrated component must be designed to be significantly more compact. Since the storage volume for liquid working medium is predetermined by the system of the application, the separation volume of the accumulator must be minimized and the storage volume for storing liquid or the utilization rate of the storage volume must be maximized.

Since the separation volume, in which the phases of the incoming two-phase mixture of working medium are separated and only the gaseous phase is directed to the outlet of the accumulator, in accumulators known from the prior art, makes up to 30% of the total volume of the accumulator, the objective to design integrated components made of circuit-internal heat exchanger and accumulator, can only be achieved with difficulty.

EP 1 564 510 A2 discloses a storage device for the liquid phase of a working medium of a refrigerant circuit of an air conditioning system. For the separation of the liquid phase and the oil portion when the air conditioning system is operated in the refrigeration system mode of the air conditioning system, there is a flow through an upper area of the volume of a collector container in a cyclonic manner starting from an inflow channel. The outflow direction of the inflow channel is oriented tangentially to an inner surface of the collector container. The two-phase mixture flowing into the upper area as a separation volume is set into rotation as it flows in. As a result, the heavier liquid phase reaches the inner wall of the collector container by centrifugal forces and flows downwards, driven by gravity. The gaseous phase of the working medium is sucked out of the collector container via an end piece of a guide pipe system which is arranged centrally in the collector container and opens into the upper area. The upper area and a lower area of the volume of a collector container are separated from one another by a thin-walled partition wall.

A circumferential ring gap is formed between a circumferential lateral surface of the partition wall and an inner wall of the collector container. The liquid phase of the working medium, driven by gravity, flows on the inner wall of the collector container through the ring gap into the lower area formed as a storage volume.

US 2020 0047098 A1 discloses a cyclone for separating gas-liquid mixtures for a refrigerant reservoir, also with an internal heat exchanger, of a vehicle air conditioning system. The reservoir has an inlet of the gas-liquid mixture, and the cyclone with an inlet chamber, an outlet chamber and at least one stationary wing in the form of a spiral to ensure the rotation of the mixture within the outlet chamber. The inlet of the gas-liquid mixture is arranged essentially coaxially to the axis of the cyclone and opens into the inlet chamber of the cyclone. In the refrigerant reservoir, the liquid phase of the working medium flows, due to gravity, through a ring gap from an upper area formed with the cyclone into the lower area formed as a storage volume.

Both the ring gap in EP 1 564 510 A2 formed within the collector container and the ring gap in US 2020 0047098 A1 formed within the refrigerant reservoir also allow portions of the gaseous working medium to pass from the upper area into the lower area due to the high kinetic energy. In the lower area, in which the liquid working medium is stored, the gaseous working medium swirls the stored liquid, especially when the liquid level rises, and transports portions of the liquid back to the outlet of the gaseous working medium arranged in the upper area, before the liquid level of the stored working medium reaches the partition wall.

The distance between the liquid level and the partition wall permissible with regard to the tolerance for liquid overflowing to the outlet of the accumulator depends on the mass flow of the working medium and is at a maximum at high mass flows. Since the liquid can be safely stored with the accumulator even with high mass flows, the volume of the lower area resulting from the maximum distance between the liquid level and the partition wall is an unsuitable and therefore unused volume for storing the liquid. The tolerance for liquid overflowing to the outlet of the accumulator is known to be reached at high to maximum mass flows when the theoretical storage volume of the liquid is ⅔ to ¾ full.

SUMMARY

It is the object of the invention to provide a compact device with minimal installation space for separating a gaseous and a liquid phase of a working medium and for storing the liquid phase. A maximum amount of liquid related to the built-up volume should be stored within the device. The device must ensure that no droplets of the liquid flow out of the device, which could destroy a compressor connected downstream in the direction of flow of the working medium. The device should be easy to manufacture in order to minimize manufacturing costs and have a long service life. In addition, a combination of the device with other components, in particular a working medium circuit or fluid circuit, should be possible.

The object is achieved by the subject matter having the features as shown and described herein.

The object is achieved by a device according to the invention for separating a gaseous and a liquid phase of a working medium and for storing the liquid phase, in particular a refrigerant, in a refrigerant circuit. The device has a volume enclosing, hollow circular cylinder-shaped wall with closed end faces, an inlet and an outlet, as well as a suction pipe.

A partition element is arranged within the volume, which divides the volume in a separation volume and a storage volume. Here, the separation volume is formed above the partition element in a direction z of gravity, while the storage volume is formed below the partition element in the direction z. The inlet is provided in the area of an upper end face.

The suction pipe is formed with a first open end for receiving the gaseous phase of the working medium and a second open end as a connection to the outlet of the device. Here, the suction pipe with the first open end opens into the separation volume.

According to the conception of the invention the partition element is formed rotationally symmetrically about an axis of rotation with an extension in the direction z and an extension in a radial direction in such a way that a ring channel which is permeable to the liquid phase of the working medium is formed between the volume enclosing wall and at least one circumferential lateral surface of the partition element. The ring channel which interconnects the separation volume and the storage volume, in particular completely, has an extension in the direction z that is many times larger than an extension in the radial direction and is substantially impermeable to the gaseous phase of the working medium during operation.

The axis of rotation running in the direction z corresponds here to the axis of symmetry of the wall. The radial direction is oriented orthogonally to the axis of rotation. An extension of the ring channel in the direction z that is many times larger than an extension in the radial direction is understood to mean a ratio of at least 1.5, in particular of at least 2.

According to a further development of the invention, the inlet of the device in combination with the separation volume downstream in the direction of flow of the working medium of the wall enclosed volume is formed in the shape of a cyclone for the rotation and separation of the gaseous and the liquid phase of the working medium about the axis of rotation oriented in the direction z.

According to a first alternative configuration of the invention, the ring channel is formed in the shape of a hollow circular cylinder with an l-shaped cross section in the section plane oriented in the direction z and running through the axis of rotation, so that an outer lateral surface of the partition element, which is opposite an inner surface of the hollow circular cylinder-shaped wall of the device, has the shape of a lateral surface of an in particular straight hollow circular cylinder.

According to a second alternative configuration of the invention, the ring channel has a T-shaped cross section in the section plane oriented in the direction z and running through the axis of rotation.

Here, the partition element is advantageously formed from at least two circular ring disks arranged at a distance from one another in direction z, the axes of symmetry of which run coaxially to one another in direction z. In each case, an intermediate space is provided between the circular ring disks adjacently arranged in the direction z in such a way that working medium is enclosed in each intermediate space during operation of the device. The groove-like intermediate spaces running in the radial direction are also referred to as blind groove or radial dead space due to the filling with immobile working medium.

The ring channel of the second alternative configuration of the invention in the design with two circular ring disks thus has two ring gaps interconnected via the intermediate space and consequently an I-shaped cross section with a radial dead space.

The ring channel is advantageously formed in the direction z with an extension in the range from 3 mm to 10 mm, in particular with an extension of 6 mm. In the radial direction, the ring channel preferably has a width in the range from 0.5 mm to 4 mm, in particular in the range from 1 mm to 2 mm. The ratio of the extension of the ring channel in direction z, which corresponds to a length, to the width in the radial direction is preferably at least 1.5, especially at least 2 and is in particular in the range from 3 to 6. When the partition element is formed from circular ring disks, the lateral surfaces of the circular ring disks are viewed as reference surfaces for the width of the ring channel.

According to a further preferred configuration of the invention, the suction pipe is formed from an outer pipe element with the first open end and an inner pipe element with the second open end. Here, the longitudinal axes of the pipe elements are oriented coaxially to one another. The longitudinal axes of the pipe elements of the suction pipe are preferably arranged on the axis of rotation of the device, that is to say, the axis of rotation of the device and the longitudinal axes of the pipe elements are oriented congruently to one another.

The partition element and the outer pipe element of the suction pipe are advantageously each formed as an injection-molded element. In addition, the partition element and the outer pipe element of the suction pipe can be formed as two separate components or as a cohesive unit and thus as an integral component.

Another advantage of the invention is that the suction pipe with the outer pipe element, starting from the first open end, extends into the storage volume and the inner pipe element extends through the partition element. Here, the second open end of the suction pipe is connected to the outlet of the device.

According to a further development of the invention, the suction pipe extends with the first open end as an open end face in direction z from below through the partition element. Here, the end face at the first open end of the suction pipe is arranged in alignment with an upper side of the partition element. The upper side of the partition element in connection with the open end of the suction pipe which is oriented in alignment thereto form a suction inlet plane. The flush arrangement of the upper side of the partition element and the end face at the first open end of the suction pipe result in a minimized pressure loss of the gas phase of the working medium when it flows into the first open end of the suction pipe.

According to a further advantageous embodiment of the invention, the partition element is arranged dividing the volume of the device in 10% separation volume and 90% storage volume, which enables a very compact construction of the device.

The working medium is preferably carbon dioxide. The device according to the invention enables an accumulator to be constructed that is as space-efficient as possible, especially for a refrigerant circuit, which is particularly suitable for the integration in a combination device with a heat exchanger inside the circuit.

The advantageous configuration of the invention also enables the device to be used for separating the gaseous and liquid phases of the working medium and for storing the liquid phase, in particular a refrigerant, in a refrigerant circuit of an air conditioning system of a motor vehicle for conditioning at least one air mass flow to be supplied to a passenger compartment.

The device ensures that the gas phase separated from the liquid phase within the separation volume does not overflow from the separation volume into the storage volume. This prevents the liquid that has collected in the storage volume from being swirled by the inflow of the gas phase and thus droplets of the liquid being transported back into the separation volume and then sucked out of the separation volume and the device.

The device according to the invention with partition element and ring channel enables, in particular in combination with the cyclone technology at the inlet or within the separation volume, a consistent separation of the phases of the working medium and thus also the suction of the gas phase on the upper side of the separation element from the separation volume.

In addition, with the device according to the invention, it is possible to fill 100% of the storage volume with liquid. This ensures a filling level-independent and mass flow-independent vapor quality at the outlet of the device, so that even with very high mass flows of the working medium, the storage volume can be filled up to the top of the partition element as the suction inlet level, which is at the level of the open end of the suction pipe. Consequently, the device according to the invention does not have any loss volume with regard to the storage capacity of the liquid during operation.

Since the principle of shielding and the quasi-sealing of the storage volume from the separation volume by means of the ring channel according to the invention works not only with low mass flows of the working medium, but in the same way and in particular also with very high and maximum mass flows of the working medium, the storage capacity of the device no longer depends on the filling level and mass flow of the working medium, as known from the prior art.

BRIEF DESCRIPTION OF DRAWINGS

Further details, features and advantages of the invention emerge from the following description of exemplary embodiments with reference to the associated drawings.

FIGS. 1A and 1B: show a device for separating a gaseous and a liquid phase of a working medium and for storing the liquid phase of a refrigerant circuit, in particular an air conditioning system of a motor vehicle, from the prior art and the cross section of a ring gap of the device, each in a lateral sectional illustration, FIGS. 2A and 2B: show a first embodiment of the device according to the invention with an I-shaped cross section of a ring channel, each in a lateral sectional illustration.

DESCRIPTION OF AN EMBODIMENT

Figure 3A:
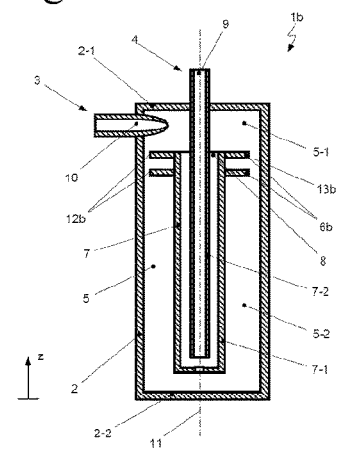
FIGS. 3A and 3B: show a second embodiment of the device according to the invention with a T-shaped cross section of the ring channel, each in a lateral sectional illustration.

FIG. 1A illustrates a prior art device 1' for separating a gaseous and a liquid phase of a working medium and for storing the liquid phase of a refrigerant circuit in a lateral sectional illustration. FIG. 1B shows the cross section of a ring gap 13' of the device 1' in a lateral sectional illustration.

The device F has a hollow circular cylinder-shaped wall 2 with two closed end faces 2-1, 2-2, which together delimit a volume 5. Here, the device F is formed with an inlet 3 for the inflow of the two-phase mixture of the working medium and an outlet 4 for the outflow of the gaseous portion of the working medium. The volume 5 is divided into an upper inlet volume or separation volume 5-1 as well as a lower storage volume 5-2 by means of a thin-walled partition element 6', which has the shape of a metal sheet.

The inlet 3 extends as a preferably pipe-shaped element in an area near the upper, first end face 2-1 through the wall 2 into the separation volume 5-1. The information provided above and below each refers to a direction z pointing in the direction of gravity.

To separate the liquid phase with the oil portion from the gaseous phase of the two-phase mixture, the working medium is introduced through the inlet 3 which is oriented tangentially to an inner surface of the wall 2 and which, in combination with the separation volume 5-1, has the shape of a cyclone 10. Here, the two-phase mixture flowing into the separation volume 5-1 is set in rotation about an axis of rotation 11 of the device 1'. The heavier liquid phase of the working medium is pressed against the inner surface of the wall 2 by centrifugal forces and flows downward on the wall 2 as a result of gravity. The lighter gaseous phase of the working medium collects in the center of the separation volume 5-1 and is sucked out of the device 1' by a centrally arranged suction pipe 7, which opens into the separation volume 5-1.

The suction pipe 7, which extends both through the storage volume 5-2 and through the separation volume 5-1, is formed from an outer pipe element 7-1 and an inner pipe element 7-2, which are arranged coaxially and evenly spaced from one another and centered in the device 1'. The pipe elements 7-1, 7-2 are oriented along the axis of rotation 11 of the device 1'.

The outer pipe element 7-1 is arranged with a first open end face projecting from the bottom through the partition element 6' as well as into the collection volume 5-1. The first, open end face of the outer pipe element 7-1 forms the first end 8 of the suction pipe 7, through which the gaseous phase of the working medium is sucked into the suction pipe 7. A second end face of the outer pipe element 7-1, which is formed distally to the first end face, is arranged in the lower area of the storage volume 5-2 and is substantially closed. A through-hole for sucking in lubricating oil from the liquid phase of the working medium is preferably formed in the second end face.

The inner pipe element 7-2, which has two open end faces, extends through the first end face 2-1 of the wall 2 and, with a second end 9 of the suction pipe 7, forms the outlet 4 of the device 1'. Between the second end face of the inner pipe element 7-2, which is formed distally to the outlet 4, and the closed second end face of the outer pipe element 7-1, a deflecting flow path for the working medium is provided, through which the working medium flowing in the flow path between the outer pipe element 7-1 and the inner pipe element 7-2 into the deflecting flow path from above is deflected inward and introduced into the inner pipe element 7-2. In the inner pipe element 7-2, the working medium flows upwards and is drained from the device 1' through the second end 9 of the suction pipe 7 or the outlet 4.

Between a circumferential lateral surface 12' of the thin-walled partition element 6' and the inner surface of the wall 2, the full-circumferential ring gap 13', which is almost one-dimensional in cross section, is formed. The liquid phase of the working medium flowing downward on the inner surface of the wall 2 as a result of gravity passes through the ring gap 13' and is collected in the storage volume 5-2.

Due to the design of the partition element 6' as a thin-walled metal sheet and thus also the small extension of the ring gap 13' in direction z, a portion of the gaseous phase also flows into the storage volume 5-2, so that there is an interaction of the gaseous phase with the stored liquid working medium. Due to the high flow rates, the gaseous working medium swirls the stored liquid working medium, so that liquid working medium also flows over again from the device 1' into the separation volume 5-1 and can be sucked out of the separation volume 5-1, regardless of the filling level of the liquid within the storage volume 5-2. Here, the swirling and mixing of the phases and the resulting suction effect of the liquid phase are dependent on the mass flow of the working medium.

The liquid droplets entrained in the gas phase sucked can damage downstream components in the refrigerant circuit of the device 1' in the direction of flow of the working medium. In particular, in a downstream compressor of the gaseous working medium, the liquid droplets can cause liquid hammering which destroys the compressor.

FIGS. 2A and 2B illustrate a first embodiment of the device 1a according to the invention for separating a gaseous and a liquid phase of a working medium and storing the liquid phase of a refrigerant circuit, in particular an air conditioning system of a motor vehicle, with an I-shaped cross section of a ring channel 13a in the sectional plane oriented in the direction z and running through the axis of rotation 11, each in a lateral sectional illustration.

Same components of the devices 1', la are identified by the same reference numerals.

The main difference between the device 1a of FIG. 2A and the device 1' of FIG. 1A is in the design of the partition element 6a, 6'. The partition element 6a of the device 1a has such an extension in the direction z that between the circumferential lateral surface 12a of the partition element 6a and the inner surface of the wall 2 there is a full-circumferential, hollow circular cylindrical ring channel 13a that is two-dimensional in cross section in a plane oriented in the direction z and spanned through the axis of rotation 11 through which the liquid phase of the working medium flowing on the inner surface of the wall 2 downward in direction z as a direction of flow as a result of gravity flows and is collected in the storage volume 5-2.

The two-phase mixture also flows in the device 1a for separating the liquid phase with the oil portion from the gaseous phase through the inlet 3 oriented tangentially relative to the inner surface of the wall 2 into the separation volume 5-1. The resulting rotating swirl of the mass flow of the working medium throws the liquid phase against the inner surface of the wall 2 by centrifugal forces, while the gaseous phase remains in the center of the separation volume 5-1 and is drained through the suction pipe 7 from the device 1a. As a result of gravity, the liquid phase flows, preferably as a film, rotating in a spiral shape on the inner surface of the wall 2 down into the storage volume 5-2.

The liquid film of the working medium flowing through the ring channel 13a when it is transferred from the separation volume 5-1 into the storage volume 5-2 prevents the gaseous phase from also passing through the ring channel 13a. Since the ring channel 13a is substantially impermeable to the gaseous phase of the working medium, no interaction of the gaseous phase with the stored liquid working medium occurs within the storage volume 5-2. Due to the impermeability of the ring channel 13a for the gaseous phase and thus only negligible flow rates of the working medium, the swirling of the stored liquid working medium in particular is prevented by the gaseous working medium. Up to 100% of the storage volume 5-2 of the device 1a can thus be filled with liquid.

The gaseous phase leaves the device 1a through the end face of the suction pipe 7, in particular the first, open end face of the outer pipe element 7-1, which is arranged at the first open end 8 in alignment with an upper side of the partition element 6a.

The ring channel 13a formed as fluidic connection between the separation volume 5-1 as an upper area of the device 1a and the storage volume 5-2 as a lower area of the device 1a has a length L as an extension in the direction z in the range from 3 mm to 10 mm, in particular a length of about 6 mm. Here, the width B of the ring channel 13a, as an extension in the radial direction, is in the range from 0.5 mm to 4 mm, in particular in the range from 1 mm to 2 mm. The ratio of length L to width B is at least 1.5, especially at least 2 and is in particular in the range from 3 to 6.

Since there is always a portion of lubricating oil in continuous circulation in the refrigerant circuit, it is ensured that in all operating modes of the evaporator, such as with or without overheating of the refrigerant or working medium at the outlet of the evaporator and thus at the inlet 3 into the device 1a, a continuous portion of liquid flows into the device 1a. After the liquid has been separated from the gas phase of the working medium within the separation volume 5-1, the liquid flows through the ring channel 13a into the storage volume 5-2. By means of the corresponding dimensioning of the ring channel 13a in length L and width B, the ring channel 13a is always completely exposed to liquid during operation, similar to a pipeline through which a single-phase liquid flows. The quasi-stationary filling of the ring channel 13a with liquid prevents gaseous working medium from passing through the ring channel 13a in parallel or together with the liquid. The liquid filling of the ring channel 13a consequently represents a seal for the gas phase of the working medium in the direction of the storage volume 5-2.

The specified blocking function is a quasi-sealing, since it enables residual amounts of gas to flow through the ring channel 13a, especially for pressure equalization within the device 1a and the needs-based return of stored refrigerant into the refrigerant circuit. However, the residual amounts of gas are energetically neither able to swirl the separated liquid, nor to transport liquid droplets back into the separation volume 5-1 and to the first end 8 of the suction pipe 7 as an inlet into the suction pipe 7.

Figure 3B:
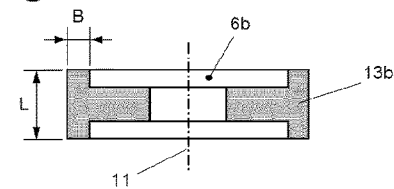

FIGS. 3A and 3B show a second embodiment of the device 1b according to the invention for separating a gaseous and a liquid phase of a working medium and storing the liquid phase of a refrigerant circuit, in particular an air conditioning system of a motor vehicle, with a T-shaped cross section of the ring channel 13b in the sectional plane oriented in the direction z and running through the axis of rotation 11, each in a lateral sectional illustration.

The main difference between the device 1b of FIG. 3A and the device 1a according to FIG. 2A is the design of the partition element 6b, 6a, in particular in the design of the lateral surface 12b, 12a of the partition element 6b, 6a. The partition element 6a of the device 1a has a flat, circular cylindrical surface 12a, while the lateral surface 12b of the partition element 6b is formed from several sections. Here, two sections lying on the outside in the direction z have circular cylindrical lateral surfaces with the same radius. A third section formed between the outer sections has a circular cylindrical lateral surface with a smaller radius than the outer sections. The circular ring surfaces interconnecting the individual sections are oriented orthogonally to the axis of rotation 11 and thus in the radial direction.

Both partition elements 6b, 6a fulfill the identical function within the device 1b, 1a. Same components of the devices 1b, 1a are again identified by the same reference numerals.

The partition element 6b of the device 1b also has such an extension in the direction z as well as a function-oriented shape that a full-circumferential, in cross-section two-dimensional ring channel 13b is formed between the circumferential lateral surface 12b of the partition element 6b and the inner surface of the wall 2, through which the liquid phase of the working medium flowing downward on the inner surface of the wall 2 in direction z as the direction of flow as a result of the gravity flows and is collected in the storage volume 5-2, while the ring channel 13b is substantially impermeable to the gaseous phase of the working medium.

The partition element 6b is formed in the shape of a dual-disk element or a multi-disk element with the same extension in direction z as the partition element 6a of the device 1a. Due to the respective distance between the disk elements, the ring channel 13b has, depending on the number of disk elements, full-circumferential intermediate spaces that are oriented in the horizontal direction, also referred to as blind grooves with regard to the operating principle. The distance between the surfaces of the disk elements facing each other is at least 0.5 mm, in particular 1 mm, and can preferably be in the range from 1 mm to 3 mm. In one embodiment of the ring channel 13b having a length of 6 mm, the disks of the dual-disk element have, for example, a thickness or disk thickness of 1.5 mm each, while the distance between the surfaces of the disk elements facing each other is 3 mm.

The distance between the surfaces of the disk elements facing each other is consequently obtained from the length of the ring channel 13b as an extension in direction z, which also corresponds to the total thickness of the partition element 6b in direction z, minus the sum of the disk thicknesses.

Each groove-shaped intermediate space oriented in the horizontal direction in the direction z between the disk elements of the partition element 6b is permanently filled with working medium, regardless of the physical state, or with lubricating oil during operation of the device 1b. The working medium, the lubricating oil or a mixture of working medium and lubricating oil are trapped in the respective intermediate space, so that each intermediate space filled in this way is irrelevant or blind to the mass flow. Thus, the described function of the ring channel 13b of the device 1b with the T-shaped cross section in the sectional plane oriented in the direction z and running through the axis of rotation 11 corresponds in an identical manner to the function of the ring channel 13a of the device 1a from FIG. 2A with the l-shaped cross section in the sectional plane oriented in the direction z and running through the axis of rotation 11, which is formed by means of the partition element 6a with a flat lateral surface 12a in connection with the inner surface of the wall 2 as a hollow circular cylindrical ring channel 13a. In particular, the function of the ring channels 13a, 13b with regard to blocking the passage for the gaseous phase of the working medium is the same.

The design of the partition element 6b as a dual-disk element or multi-disk element enables the partition element 6b to be connected to the outer pipe element 7-1 of the suction pipe 7 to form a coherent unit or integral component, in particular made of a plastic. The corresponding manufacturing costs of the device 1b can thus be reduced.

Figure 4A:
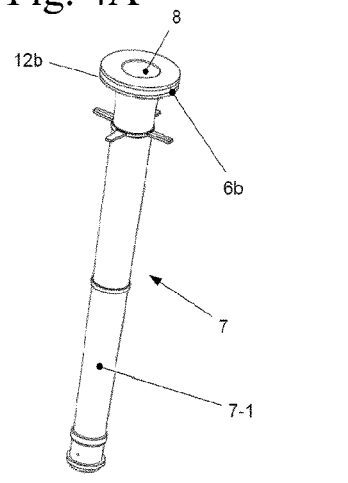
FIGS. 4A and 4B: show a first partition element of the second embodiment of the device according to FIG. 3A as an integral component with the suction pipe of the device in a perspective view, as well as a second partition element of the second embodiment of the device as an integral component with the suction pipe, in a lateral sectional illustration.
Figure 4B:
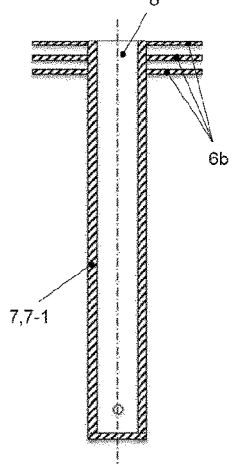

FIGS. 4A and 4B show a first partition element 6b of the second embodiment of the device 1b according to FIG. 3A as an integral component with the suction pipe 7 of the device 1b in a perspective view as well as a second partition element 6b of the second embodiment of the device 1b as an integral component with the suction pipe 7 in a lateral sectional illustration.

The partition element 6b is formed both in the design as a dual-disk element according to FIG. 4A and in the design as a multi-disk element, in particular as a three-disk element, according to FIG. 4B, in each case with the suction pipe 7, especially with the outer pipe element 7-1 of the suction pipe 7, as a common, integral injection-molded part made of a plastic. The outer pipe element 7-1 and the partition element 6b each represent a coherent unit.

Figure 4C:
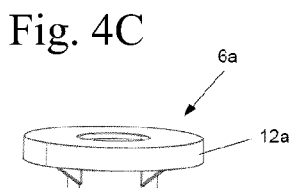
FIGS. 4C and 4D: show a partition element of the first embodiment of the device according to FIG. 2A as an individual element and in connection with a suction pipe of the device, each in a perspective view.
Figure 4D:
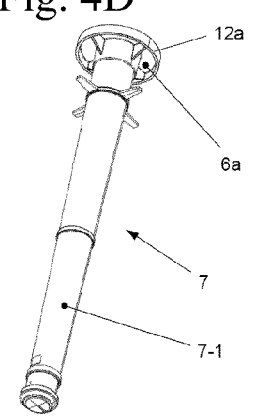

FIGS. 4C and 4D illustrate the partition element 6a of the first embodiment of the device 1a according to FIG. 2A as a single element and in connection with the suction pipe 7 of the device 1a, each in a perspective view. The partition element 6a and the suction pipe 7 are formed as separate injection molded parts made of a plastic and are plugged together and interconnected as individual components during the assembly of the device 1a.

In order to increase the coefficient of performance of the refrigerant circuit as a measure of the efficiency when operating the refrigerant circuit, it is known that a circuit-internal heat exchanger can be used. In order to avoid the formation of an additional component, the individual components accumulator and circuit-internal heat exchanger can be combined to form an integrated component, also referred to as a combination device.

Figure 5A:
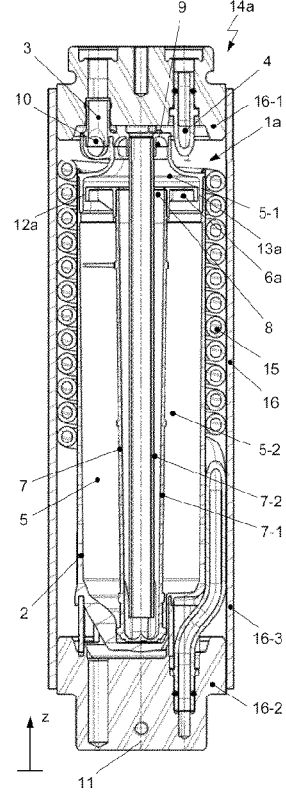
FIGS. 5A and 5B: show a device from FIG. 2A as a component of a combination device with a circuit-internal heat exchanger, as well as a detailed view of the combination device, each in a lateral sectional illustration, as well as FIGS. 5C and 5D: show detailed views of the combination device from FIGS. 5A and 5B in comparison to the device from the prior art according to FIG. 1A, each with labelling of the gaseous phase and the liquid in a lateral sectional illustration.
Figure 5B:
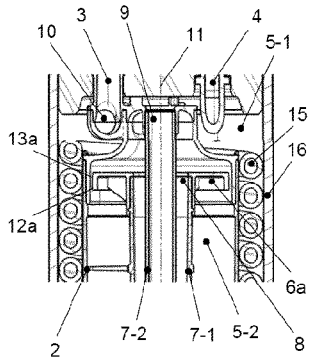
Figure 5C:
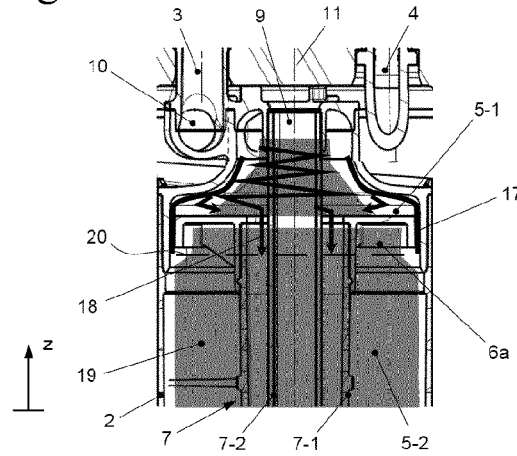
Figure 5D:
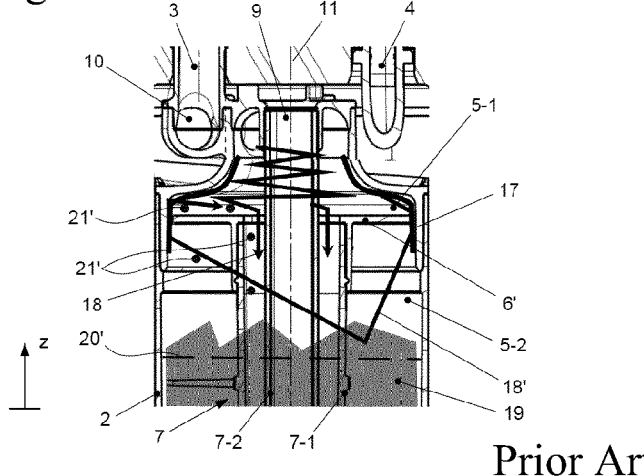
Figure 6A:
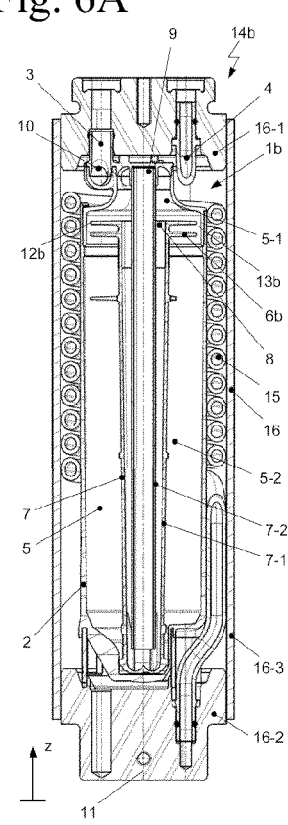
FIGS. 6A and 6B: show a device from FIG. 3A as a component of a combination device with a circuit-internal heat exchanger, as well as a detailed view of the combination device, each in a lateral sectional illustration.
Figure 6B:
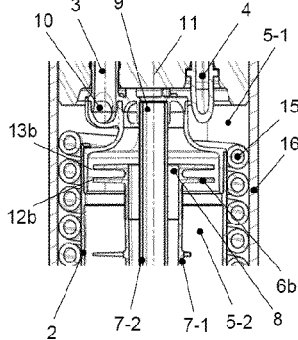

The device 1a of FIG. 2A is shown in FIGS. 5A and 5B as a component of a combination device 14a with a circuit-internal heat exchanger 15 with a detailed view of the combination device 14a, each in a lateral sectional illustration. FIGS. 5C and 5D show detailed views of the combination device 14 of FIGS. 5A and 5B in comparison to the device 1' from the prior art according to FIG. 1A, each with labelling of the gas phase 18, 18' and the liquid 19 in lateral sectional illustration. FIGS. 6A and 6B show the device 1b of FIG. 3A also as a component of a combination device 14b with the circuit-internal heat exchanger 15 in a detailed view of the combination device 14b, each in a lateral sectional illustration.

When the device 1a, 1b is formed as an accumulator of the refrigerant in combination with the circuit-internal heat exchanger 15 in the combination device 14a, 14b, the circuit-internal heat exchanger 15 is arranged in the form of a coiled tubing coaxially around the wall 2 of the device 1a, 1b. When the space-saving combination device 14a, 14b is arranged, for example in the engine compartment of the motor vehicle, the wall 2 is also thermally insulated against the introduction of heat from the engine compartment. The low-pressure side of the circuit-internal heat exchanger 15 absorbs the heat transferred from the engine compartment to the combination device 14a, 14b, so that the device 1a, 1b, especially the storage volume 5-2 with the liquid stored therein, is not heated, which would lead to the evaporation of the liquid.

The housing 16 of the combination device 14a, 14b has a cover element 16-1 and a base element 16-2, which are interconnected via a lateral surface element 16-3. In the volume enclosed by the housing 16, in the radial direction from the outside to the inside, the circuit-internal heat exchanger 15 as a coiled pipe, the wall 2 of the device 1a, 1b for receiving the liquid working medium and the suction pipe 7 for draining the gaseous phase of the working medium from the combination device 14a, 14b are each arranged concentrically to the axis of rotation 11.

The lower area of the device 1a, 1b is formed as a lubricating oil sump area, tapering conically downwards, in order to concentrate and collect the lubricating oil which is deposited. The lubricating oil together with the gaseous phase of the working medium is sucked out of the liquid phase of the working medium from the combination device 14a, 14b through a through hole formed in the second end face of the outer pipe element 7-1 of the suction pipe 7.

To separate the liquid phase with the oil portion from the gaseous phase of the two-phase mixture, the working medium is introduced through the inlet 3, which is oriented tangentially to the inner surface of the wall 2 and which, in combination with the separation volume 5-1, has the shape of the cyclone 10. The two-phase mixture flowing into the separation volume 5-1 is set in rotation about the axis of rotation 11. Here, the heavier liquid phase of the working medium is pressed against the inner surface of the wall 2 by the centrifugal forces that occur and flows downward on the wall 2 as a liquid film 17 as a result of gravity. The lighter gaseous phase 18 is collected in the center of the separation volume 5-1 and is sucked off through the centrally arranged suction pipe 7, which opens into the separation volume 5-1.

Since the liquid film 17 of the working medium flowing through the ring channel 13a when passing from the separation volume 5-1 to the storage volume 5-2, prevents the gaseous phase 18, according to FIG. 5C of the device 1, to pass the ring channel 13a also, in particular swirling of the stored liquid 19 by the gaseous phase 18 is avoided, so that up to 100% of the storage volume 5-2 can be filled with liquid 19. The filling level 20 of the liquid can reach as far as the underside of the partition element 6a.

In comparison, when the partition element 6' is formed as a thin-walled metal sheet, according to FIG. 5D of the device 1' from the prior art, a portion of the gaseous phase 18' flows through the ring gap 13' into the storage volume 5-2. Within the storage volume 5-2, the gaseous phase 18' interacts with the stored liquid 19 of the working medium. Due to the high flow rates, the gaseous phase 18' swirls the liquid 19, so that a liquid transfer 21' of the working medium flows back into the separation volume 5-1 in the form of droplets and can be sucked out of the separation volume 5-1, regardless of the filling level 20' of the liquid within the storage volume 5-2. The storage volume 5-2 can only be filled with liquid 19 up to a filling level 20' which, compared to the filling level 20 of the device 1 of FIG. 5C, is significantly further away from the underside of the partition element 6' in the direction z. In this way, a large portion of the volume remains unused within the storage volume 5-2.

LIST OF REFERENCE NUMERALS

1a, 1b, 1' device
2 wall
2-1 first end face of wall 2
2-2 second end face of wall 2
3 inlet
4 outlet
5 volume
5-1 separation volume
5-2 storage volume
6a, 6b, 6' partition element
6b-1 first circular ring disk
6b-2 second circular ring disk
7 suction pipe
7-1 outer pipe element
7-2 inner pipe element
8 first end of suction pipe 7
9 second end of suction pipe 7
10 cyclone
11 axis of rotation
12a, 12b, 12' lateral surface of partition element 6a, 6b, 6'
13a, 13b ring channel
13' ring gap
14a, 14b combination device
15 circuit-internal heat exchanger
16 housing
16-1 cover element
16-2 base element
16-3 lateral surface element
17 liquid film
18, 18' gaseous phase
19 liquid
20, 20' liquid level
21' liquid transfer
B width of ring channel 13a, 13b
L length of ring channel 13a, 13b
z direction

The invention claimed is:

1. A device for separating a gaseous phase and a liquid phase of a working medium and for storing the liquid phase, the device comprising:

a volume enclosing, a hollow circular cylinder-shaped wall with closed end faces as well as an inlet and an outlet, wherein a partition element is arranged within the volume, which divides the volume in a separation volume and a storage volume, wherein the separation volume is formed above the partition element in a direction z of gravity, and the storage volume is formed below the partition element, the inlet is arranged in an area of an upper end face of the end faces, a suction pipe with a first open end for receiving the gaseous phase of the working medium and a second open end as a connection to the outlet, wherein the suction pipe with the first open end opens into the separation volume, wherein the partition element is formed rotationally symmetrically about an axis of rotation with an extension in the direction z and an extension in a radial direction in such a way that a ring channel which is permeable to the liquid phase of the working medium is formed between the wall and at least one circumferential lateral surface of the partition element and which interconnects the separation volume and the storage volume, wherein the ring channel has an extension in the direction z that is larger than the extension in the radial direction and is always filled with the liquid phase of the working medium forming a liquid seal and thus impermeable to the gaseous phase of the working medium during operation.

2. The device according to claim 1, wherein the inlet in combination with the separation volume downstream in a direction of flow of the working medium is formed in a shape of a cyclone for the rotation and separation of the gaseous phase and the liquid phase of the working medium about the axis of rotation oriented in the direction z.

3. The device according to claim 1, wherein the ring channel is formed in a shape of a hollow circular cylinder with an l-shaped cross section in a section plane oriented in the direction z and running through the axis of rotation.

4. The device according to claim 1, wherein the ring channel is formed with a T-shaped cross section in a section plane oriented in the direction z and running through the axis of rotation.

5. The device according to claim 4, wherein the partition element is formed from at least two circular ring disks arranged at a distance from one another in the direction z, axes of symmetry of which run coaxially to one another in the direction z and which are configured and arranged in such a way that, during operation of the device, the working medium is enclosed in each intermediate space formed between adjacently arranged ones of the at least two circular ring disks.

6. The device according to claim 1, wherein the ring channel has an extension in a range from 3 mm to 10 mm, in the direction z.

7. The device according to claim 1, wherein the ring channel has a width in a range from 0.5 mm to 4 mm, in the radial direction.

8. The device according to claim 1, wherein the suction pipe is formed from an outer pipe element with the first open end and an inner pipe element with the second open end, wherein longitudinal axes of the outer pipe element and the inner pipe element are oriented coaxially to one another.

9. The device according to claim 8, wherein the partition element and the outer pipe element of the suction pipe are formed as an injection-molded element.

10. The device according to claim 8, wherein the partition element and the outer pipe element of the suction pipe are formed as two separate components.

11. The device according to claim 8, wherein the partition element and the outer pipe element of the suction pipe are formed as a coherent unit and integral component.

12. The device according to claim 8, wherein the suction pipe is arranged extending into the storage volume with the outer pipe element starting from the first open end and the inner pipe element is arranged extending through the partition element, wherein the second open end is connected to the outlet.

13. The device according to claim 1, wherein the suction pipe is arranged extending with the first open end in the direction z from below through the partition element, and wherein an end face of the suction pipe is arranged in alignment with an upper side of the partition element at the first open end.

14. The device according to claim 1, wherein the partition element is arranged dividing the volume of the device in 10% as the separation volume and 90% as the storage volume.

15. The device according to claim 1, wherein the working medium is carbon dioxide (R744).

16. The device according to claim 1, wherein the device is formed as a component of a combination device which has a circuit-internal heat exchanger.

17. Use of a device for separating the gaseous phase and the liquid phase of the working medium and for storing the liquid phase according to claim 1 in a refrigerant circuit of an air conditioning system of a motor vehicle.

* * * * *